United States Patent [19]

Aldrich et al.

[11] 4,154,867

[45] May 15, 1979

[54] SUGARLESS CANDIES

[75] Inventors: Deborah Aldrich, Greenwich, Conn.; Walter Vink, Purdys Station; Richard W. Deptula, Port Chester, both of N.Y.; Donald J. Muskus, Greenwich, Conn.; Paul R. Fronczkowski, Oakland; Marc Chrusch, Cresskill, both of N.J.

[73] Assignee: Life Savers, Inc., New York, N.Y.

[21] Appl. No.: 859,784

[22] Filed: Dec. 12, 1977

[51] Int. Cl.² ............................................. A23G 3/00
[52] U.S. Cl. .................................. 426/658; 426/660; 426/804
[58] Field of Search................ 426/660, 548, 804, 658

[56] References Cited

U.S. PATENT DOCUMENTS

| Re. 26,959 | 9/1970 | Conrad | 426/548 |
| 3,556,811 | 1/1971 | Smith | 426/660 |
| 3,738,845 | 6/1973 | Liebrand | 426/548 |

*Primary Examiner*—Jeanette M. Hunter
*Attorney, Agent, or Firm*—Lawrence S. Levinson; Merle J. Smith; Burton Rodney

[57] ABSTRACT

A sugarless candy is provided which has improved flavor and sweetness and contains one or more natural sweeteners, namely, a hydrogenated starch hydrolysate, preferably in combination with a sugar alcohol, such as sorbitol, one or more fruit flavors, together with malic acid which serves as a flavor enhancer.

7 Claims, No Drawings

SUGARLESS CANDIES

The present invention relates to a sugar-free hard candy of improved flavor and sweetness, but which is free of artificial sweeteners, and more particularly to a sugar-free hard candy containing one or more hydrogenated starch hydrolysates and a sugar alcohol, such as sorbitol as sweeteners, one or more flavors, and malic acid as a flavor enhancer.

Sugar-free sour or fruit-type candies now available generally include an artificial sweetener, usually a saccharin salt, and citric acid and other fruit flavors. However, since the safety of saccharin for human consumption has been seriously questioned, the candy industry is now focusing its attention on non-sugar candies containing natural sweeteners as saccharin substitutes.

Until now, sugar-free, saccharin-free sour candies have been prepared using sugar alcohols, primarily, sorbitol, in combination with citric acid and other fruit flavors. Unfortunately, although such candies deliver a pleasant sour flavor, they are less than satisfactory in providing desired sweetness levels. Attempts to enhance sweetness of such fruit-flavored candies by employing sorbitol in combination with other natural sweeteners, such as hydrogenated starches, have not been successful. It has been found that the citric acid necessary for providing the sour note to the fruit flavor, such as cherry, suppresses sweetness and mask the fruit flavor, imparts distinct citrus overtones in the case of non-citrus flavors, such as cherry and pineapple, and imparts a bland taste in the case of citrus flavors, such as lemon, lime, orange and grapefruit.

U.S. Pat. No. Re. 26,959 to Conrad discloses a sugar substitute which is a hydrogenated starch hydrolysate prepared by hydrogenating a saccharified starch having a dextrose equivalent of 15-75% and containing dextrines, until substantially no dextrose and maltose remain.

Surprisingly, in accordance with the present invention, the above flavor problems associated with the use of citric acid in combination with hydrogenated starch hydrolysates and sorbitol has been resolved by replacing the citric acid with malic acid.

The sour or fruit-flavored sugarless hard candy of the invention consists essentially of one or more hydrogenated starch hydrolysates in an amount within the range of from about 10 to about 99%, and preferably from about 50 to about 98% by weight, one or more sugar alcohols in an amount with the range of from about 1 to about 90%, and preferably from about 1 to about 25% by weight, malic acid in an amount within the range of from about 0.2 to about 5%, and preferably from about 0.5 to about 2.5% by weight. In addition, the candy of the invention may include flavoring, coloring agents, preservatives, and the like.

The sugar alcohols suitable for use herein include soribitol, xylitol, mannitol, maltitol, and combinations thereof, with sorbitol being preferred.

The hydrogenated starch also referred to as hydrogenated starch hydrolysates employed herein may include those disclosed in U.S. Pat. No. Re. 26,959 as well as various hydrogenated glucose syrups and/or powders which contain sorbitol, hydrogenated disaccharides, tri- to hexa-hydrogenated saccharides, and hydrogenated higher polysaccharides.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids contents will range from about 72 to about 80% which solids are made of from about 4 to about 20% sorbitol, from about 20 to about 65% hydrogenated disaccharides (that is, maltitol), from about 15 to about 45% tri- to hepta-hydrogenated saccharides, and from about 10 to about 35% hydrogenated saccharides higher than hepta.

The sugarless candy in accordance with the invention may also comprise flavoring agents in an amount of from about 0.01 to about 10% by weight and preferably from about 0.2 to about 0.25% by weight, fruit or mixed fruit flavors.

The sugarless candy may also contain small amounts of coloring agents, preservatives and the like.

Thus, a preferred sugarless candy of the invention may have the following percentage of ingredients:

| | |
|---|---|
| Hydrogenated starch hydrolysate | 50-98% |
| Sorbitol | 1-25% |
| Malic Acid | 0.5-2.5% |
| Flavoring | 0.01-2% |

The sugarless candy of the invention is prepared by heating, with mixing, a mixture of hydrogenated starch hydrolysates, sorbitol, malic acid and other appropriate additives, such as flavors, coloring agents, preservatives and the like, cooling and then tabletting.

The following Examples represent preferred embodiments of the present invention.

EXAMPLE 1

A sugarless wild cherry flavored candy having the following composition is prepared as described below.

| Ingredient | Amount (Parts by Weight) |
|---|---|
| Hydrogenated Starch Hydrolysate Syrup (78% solids, including 6% sorbitol and 50% maltitol) | 97 |
| Sorbitol Syrup | 2 |
| Malic Acid | 1 |
| Cherry Flavor | 0.25 |
| Color | 0.4 |

The hydrogenated starch hydrolysate and sorbitol syrups are fed into the top of a mixing kettle and are cooled under constant slow agitation to 330°-335° F. The coloring agent is added at 280°-300° F. The mix is dropped at 25" Hg and held under vacuum for 10 minutes. The hot mix is then transferred to a mixing table where malic acid and flavor are added with mixing. The candy mix is allowed to cool to 160°-170° F. and is tabletted. The so-prepared candy is found to have a pleasant cherry flavor which is enhanced by the presence of malic acid.

Control A candy is prepared as described above with the exception that the malic acid is replaced with citric acid. The Control A cherry flavored candy is found to have a distinct undesirable citrus overtone. The citric acid masks the cherry flavor.

Control B candy is prepared as described above in Example 1 with the exception that the malic acid is replaced with tartaric acid. The Control B candy is found to have a salty and metallic taste due to the presence of tartaric acid therein.

EXAMPLE 2

A sugarless lemon-flavored candy having the following composition is prepared as described in Example 1.

| Ingredient | Amount (Parts by Weight) |
| --- | --- |
| Hydrogenated Starch Hydrolysate Syrup (as described in Example 1) | 96 |
| Sorbitol Syrup | 2 |
| Malic Acid | 1 |
| Flavor | 0.5 |

The lemon-flavored candy produced is found to have a pleasant lemon flavor. The malic acid enhances the lemon flavor giving the candy a good initial impact and sustaining lemon flavor.

Control C candy is produced as described above (Example 2) except that malic acid is replaced with citric acid. The Control C candy is found to have a very bland lemon flavor. The citric acid did not enhance the lemon flavor.

Control D candy is produced as described above except that malic acid is replaced with tartaric acid. The Control D candy is found to have a salty and metallic taste due to the presence of tartaric acid therein.

EXAMPLES 3 to 6

Lime, orange, grapefruit (pink) and sweet pineapple candies containing hydrogenated starch hydrolysate, sorbitol, malic acid and flavor are prepared as described above.

| Ingredient (Parts by Weight) | Ex. 3 (Lime) | Ex. 4 (Orange) | Ex. 5 (Grapefruit-pink) | Ex. 6 (Sweet pineapple) |
| --- | --- | --- | --- | --- |
| Hydrogenated Starch Hydrolysate Syrup | 96.6 | 97 | 96 | 96 |
| Sorbitol Syrup | 2 | 2 | 2 | 2 |
| Malic Acid | 1.4 | 1 | 1.4 | 1.4 |
| Flavor | 1 | 1 | 0.4 | 0.4 |

Where the Examples 3 to 6 malic acid containing candies are tested against candies of similar composition with the exception that malic acid is replaced with citric acid and tartaric acid, the Examples 3 to 6 candies are vastly superior in taste and sweetness to the control candies.

What is claimed is:

1. A sugarless candy consisting essentially of a hydrogenated starch hydrolysate in an amount within the range of from about 50 to about 98% by weight, malic acid, and optionally a sugar alcohol.

2. The candy as defined in claim 1 including a sugar alcohol.

3. The candy as defined in claim 2 wherein the sugar alcohol is sorbitol and is present in an amount within the range of from about 1 to about 25% by weight.

4. The candy as defined in claim 1 further including one or more flavors.

5. The candy as defined in claim 1 wherein said malic acid is present in an amount ranging from about 0.2 to about 5% by weight.

6. The candy as defined in claim 1 wherein said hydrogenated starch hydrolysate includes a mixture of sorbitol and maltitol.

7. The candy as defined in claim 1 wherein said malic acid is present in an amount within the range of from about 0.5 to about 2.5% by weight, and including sorbitol as the sugar alcohol present in an amount within the range of from about 1 to about 25% by weight.

* * * * *